United States Patent
Daiku (10) Patent No.: US 8,144,293 B2
(45) Date of Patent: Mar. 27, 2012

(54) LIQUID CRYSTAL DISPLAY APPARATUS CAPABLE OF LIMITING VIEW ANGLE

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 301 days.

(21) Appl. No.: 12/624,752

(22) Filed: Nov. 24, 2009

(65) Prior Publication Data

US 2010/0073601 A1    Mar. 25, 2010

Related U.S. Application Data (62) Division of application No. 11/541,304, filed on Sep. 29, 2006.

(30) Foreign Application Priority Data

Sep. 29, 2005    (JP) ................. 2005-283521

(51) Int. Cl.
*G02F 1/1335*    (2006.01)
*G02B 27/26*    (2006.01)

(52) U.S. Cl. .............. 349/117; 349/9; 349/15; 349/119; 359/465

(58) Field of Classification Search ................ 349/9, 15, 349/117–121; 359/465
See application file for complete search history.

(56) References Cited

U.S. PATENT DOCUMENTS

| | | | |
|---|---|---|---|
| 6,239,853 B1 * | 5/2001 | Winker et al. | 349/117 |
| 2005/0046941 A1 | 3/2005 | Satoh et al. | |
| 2005/0286000 A1 | 12/2005 | Tsai et al. | |

FOREIGN PATENT DOCUMENTS

JP    2004-133334 A    4/2004

* cited by examiner

*Primary Examiner* — Mark Robinson
*Assistant Examiner* — Charles Chang
(74) *Attorney, Agent, or Firm* — Holtz, Holtz, Goodman & Chick, PC

(57) ABSTRACT

A liquid crystal display apparatus has a liquid crystal display device, a surface light source, and a view angle limiting device arranged between the surface light source and the liquid crystal display device. The view angle limiting device includes first and second transparent plates facing each other with a gap therebetween, a plurality of first ½ retardation layers having a predetermined shape formed to be spaced apart from each other on one of the facing inner surfaces of the first and second transparent plates, a plurality of second ½ retardation layers formed on the other inner surface at regions corresponding to the regions between the first ½ retardation layers, and a polarizing film provided at the outer surface of one of the first and second transparent plates that faces the surface light source.

13 Claims, 5 Drawing Sheets

LIQUID CRYSTAL DISPLAY APPARATUS CAPABLE OF LIMITING VIEW ANGLE

CROSS-REFERENCE TO RELATED APPLICATIONS

The present application is a Divisional Application of U.S. application Ser. No. 11/541,304 filed Sep. 29, 2006, which is based on Japanese Patent Application No. 2005-283521 filed on Sep. 29, 2005 both of which are incorporated herein by reference.

BACKGROUND OF THE INVENTION

1. Field of the Invention

The present invention relates to a liquid crystal display apparatus capable of limiting its view angle.

2. Description of the Related Art

Liquid crystal display devices have a wide view angle. Therefore, there is a risk that the display thereof might be seen by someone other than the viewer from an oblique direction (a direction inclined from the direction of the normal line of the liquid crystal display device).

As a liquid crystal display apparatus which prevents its display from a peeper, there is proposed such a liquid crystal display apparatus in which a view angle limiting device is disposed at one side of the liquid crystal display device for reducing visibility from a direction inclined from the front forward direction of the liquid crystal display device, so that wide view angle display, and narrow view angle display of high security with no risk of peeing by others, are available (Unexamined Japanese Patent Application KOKAI Publication No. 2004-133334).

The view angle limiting device is structured such that a plurality of regions are formed on both of the facing inner surfaces of a pair of substrates, and electrodes having a predetermined shape are formed correspondingly to the respective regions, so that in each region, liquid crystal molecules of a liquid crystal layer sealed between the pair of substrates are aligned in an alignment state having a view angle in a direction inclined to one side from the direction of the normal line of the liquid crystal display device, and in an alignment state having a view angle in a direction inclined to a side opposite to that side.

This liquid crystal display apparatus limits the view angle of a display image of the liquid crystal display device, by reducing the visibility from an oblique direction by applying a voltage between the electrodes of the view angle limiting device.

That is, when no voltage is applied between the electrodes of the view angle limiting device, i.e., when the view angle limiting device is in a non-display status, the display image of the liquid crystal display device can be seen at a wide view angle. In contrast, when a voltage is applied between the electrodes of the view angle limiting device, there appear displays which correspond to the respective electrodes having the predetermined shape and corresponding to the regions of the view angle limiting device that have a view angle in the direction inclined to one side or corresponding to the regions of the view angle limiting device that have a view angle in the direction inclined to the side opposite to that side, and the display image of the liquid crystal display device is concealed by such displays, when the display image is seen from the direction inclined to one side from the front forward direction and from the direction inclined to the side opposite to that side. Therefore, the display image of the liquid crystal display device becomes unrecognizable from the directions inclined to one side and to the side opposite to that side, and the view angle of the display image is thus seemingly limited, which means that the view angle of the display image is narrowed.

However, the view angle limiting device, in which the liquid crystal molecules are aligned in different alignment states in the respective regions obtained by dividing the area corresponding to the screen of the liquid crystal display device into a plurality of regions, is hard to manufacture, because a complex aligning process (rubbing on aligning films) for imparting different directivities to each region has to be applied to the inner surfaces of the pair of substrates.

SUMMARY OF THE INVENTION

An object of the present invention is to provide a liquid crystal display apparatus capable of limiting the view angle. Another object of the present invention is to provide a liquid crystal display apparatus capable of controlling the view angle to obtain wide view angle display and narrow view angle display.

To achieve the above object, a liquid crystal display apparatus according to a first aspect of the present invention comprises a liquid crystal display device having a screen region on which a plurality of pixels for controlling light transmission are arranged in a matrix, a surface light source arranged at an opposite side to an observer side of the liquid crystal display device, for irradiating illumination light toward the liquid crystal display device, and a view angle limiting device comprising: a first retardation plate which has a plurality of first retardation layers having a predetermined plan-view shape for giving a phase difference of ½ of a wavelength to a ray of transmission light and arranged on a region of the first retardation plate corresponding to the screen region of the liquid crystal display device, such that the first retardation layers are spaced apart from each other; a second retardation plate which is arranged so as to have a predetermined gap from the first retardation plate and which has a plurality of second retardation layers for giving a phase difference of ½ of a wavelength to a ray of transmission light and arranged on a region of the second retardation plate corresponding to the screen region such that the second retardation layers are positioned at regions other than regions corresponding to where the plurality of first retardation layers are arranged; and a polarizing film provided at an outer surface of one of the first and second retardation plates, the view angle limiting device being arranged between the liquid crystal display device and the surface light source with the polarizing film facing the surface light source.

Since the liquid crystal display apparatus according to the present invention has the view angle limiting device arranged between the liquid crystal display device and the surface light source in order to allow transmission of a ray of light that enters the liquid crystal display device toward a direction within the view angle and to shield a ray of light that enters the liquid crystal display device toward a direction that is not within the view angle by means of the polarizing plate of the liquid crystal display device, the apparatus can perform narrow view angle display of high security that prohibits peepers from seeing the display from an oblique direction.

Furthermore, since the view angle limiting device has a simple structure in which the plurality of first retardation layers formed into a predetermined shape and the plurality of second retardation layers are arranged to face each other and the polarizing film is provided at a side of the retardation layers that are closer to the surface light source, the device can be easily manufactured, resulting in reducing the cost of the liquid crystal display apparatus.

In the liquid crystal display apparatus according to the present invention, it is preferred that the liquid crystal display device comprise a pair of polarizing plates arranged at the observer side and an opposite side to the observer side, and a transmission axis of the polarizing film of the view angle limiting device be arranged so as to be substantially orthogonal to a transmission axis of the polarizing plate arranged at the opposite side to the observer side of the liquid crystal display device. It is also preferred that a slow axis of the first retardation layers of the view angle limiting device and a slow axis of the second retardation layers be substantially parallel with each other, and cross the transmission axis of the polarizing film at an angle of substantially 45°.

In the liquid crystal display apparatus according to the present invention, it is preferred that the first retardation layers and the second retardation layers of the view angle limiting device be respectively formed into a stripe shape that runs along a predetermined direction. It is further preferred that the first retardation layers and the second retardation layers of the view angle limiting device be respectively formed into a stripe shape that runs along an up and down direction of the liquid crystal display device when seen from an observer. And it is preferred that the first retardation layers of the view angle limiting device be formed into a stripe shape whose width is substantially equal to an interval between the first retardation layers and their adjoining first retardation layers. It is preferred that the second retardation layers of the view angle limiting device be formed into a stripe shape whose width is substantially equal to an interval between the second retardation layers and their adjoining second retardation layers. It is further preferred that the second retardation layers of the view angle limiting device be formed so as to have a width which is substantially equal to an interval between adjoining first retardation layers, and so as to be spaced apart from each other at an interval which is substantially equal to a width of the first retardation layers. And it is preferred that the second retardation layers and the first retardation layers of the view angle limiting device be arranged to face each other with a distance therebetween that is substantially equal to a width of the respective retardation layers or equal to an interval between the respective retardation layers.

In the liquid crystal display apparatus according to the present invention, it is preferred that the first and second retardation plates of the view angle limiting device be constituted by forming the first retardation layers and the second retardation layers on facing inner surfaces of a first transparent plate and second transparent plate which are arranged to face each other with a gap therebetween. In this case, it is preferred that the first transparent plate and the second transparent plate be joined to each other via a spacer. And it is preferred that the spacer have a thickness corresponding to a length of a distance between the first retardation layers and the second retardation layers, at which distance a ray of light which enters a range of a view limiting angle which is not within a range of a predetermined view angle, passes through both the first and second retardation layers, and passes through non-retarding regions that exist between the first retardation layers on the first transparent plate and non-retarding regions that exist between the second retardation layers on the second transparent plate. It is further preferred that the spacer have a thickness which makes a distance between the first retardation layers and the second retardation layers substantially equal to a width of the respective retardation layers or an interval between the respective retardation layers.

In the liquid crystal display apparatus according to the present invention, it is preferred that the first and second retardation plates of the view angle limiting device be formed such that a distance therebetween is adjustable. In this case, it is preferred that the first and second retardation plates have the first retardation layers and the second retardation layers formed on facing inner surfaces of a first transparent plate and second transparent plate arranged to face each other with a gap therebetween, and be joined to each other via a spacer having elasticity. It is further preferred that the first transparent plate and the second transparent plate of the view angle limiting device be formed to be separable and contactable such that they face each other with a gap therebetween, and such that they airtightly contact each other. It is still further preferred that the liquid crystal display apparatus further comprise a facing distance changing device which changes a facing distance between the first and second retardation plates.

A liquid crystal display apparatus according to a second aspect of the present invention comprises a liquid crystal display device having a screen region on which a plurality of pixels for controlling light transmission are arranged in a matrix, a surface light source arranged at an opposite side to an observer side of the liquid crystal display device, for irradiating illumination light toward the liquid crystal display device, and a view angle limiting device comprising: a first retardation plate having a plurality of first retardation layers for giving a phase difference of ½ of a wavelength to a ray of transmission light, which are arranged on a region of a first transparent plate corresponding to the screen region of the liquid crystal display device such that the first retardation layers are spaced apart from each other and each have a stripe shape that runs in an up and down direction as seen from the observer side of the liquid crystal display device; a second retardation plate arranged to have a predetermined gap from the first retardation plate and having a plurality of second retardation layers for giving a phase difference of ½ of a wavelength to a ray of transmission light, which are arranged on a region of a second transparent plate corresponding to the screen region such that the second retardation layers are positioned at regions other than regions corresponding to where the first retardation layers are arranged; and a polarizing film provided at an outer surface of one of the first and second retardation plates, the view angle limiting device being arranged between the liquid crystal display device and the surface light source with the polarizing film facing the surface light source.

Since the view angle limiting device of the liquid crystal display apparatus according to the present invention has the plurality of first retardation layers having a predetermined shape formed on the inner surface of the first transparent plate facing the second transparent plate with a gap therebetween, and has the plurality of second retardation layers formed on the inner surface of the second transparent plate so as to face the regions between the first retardation layers on the first transparent plate, the apparatus can perform narrow view angle display which makes the entire screen black when seen from an oblique direction, and can be manufactured easily because of its simple structure.

In the liquid crystal display apparatus according to the present invention, it is preferred that the first transparent plate and second transparent plate of the first retardation plate and second retardation plate be joined to each other via a spacer which is set to have a thickness corresponding to a length of a distance between the first retardation layers and the second retardation layers, at which distance a ray of light which enters a range of a view limiting angle which is not within a range of a predetermined view angle, passes through both the first and second retardation layers, and passes through non-retarding regions that exist between the first retardation layers on the first transparent plate and non-retarding regions that exist between the second retardation layers on the second transparent plate.

A liquid crystal display apparatus according to a third aspect of the present invention comprises a liquid crystal display device having a screen region on which a plurality of pixels for controlling light transmission are arranged in a matrix, a surface light source arranged at an opposite side to an observer side of the liquid crystal display device, for irradiating illumination light toward the liquid crystal display device, a view angle limiting device comprising: a first retardation plate which has a plurality of first retardation layers having a predetermined plan-view shape for giving a phase difference of ½ of a wavelength to a ray of transmission light and arranged on a region of the first retardation plate corresponding to the screen region of the liquid crystal display device, such that the first retardation layers are spaced apart from each other; a second retardation plate which is arranged so as to have a predetermined gap from the first retardation plate and which has a plurality of second retardation layers for giving a phase difference of ½ of a wavelength to a ray of transmission light and arranged on a region of the second retardation plate corresponding to the screen region such that the second retardation layers are positioned at regions other than regions corresponding to where the plurality of first retardation layers are arranged; and a polarizing film provided at an outer surface of one of the first and second retardation plates, the view angle limiting device being arranged between the liquid crystal display device and the surface light source with the polarizing film facing the surface light source, and a facing distance changing device which changes a facing distance between the first and second retardation plates.

Since the liquid crystal display apparatus according to the present invention comprises the facing distance changing device which changes the facing distance between the first and second retardation plates, it can select between narrow view angle display and wide view angle display which allows the display to be seen also from an oblique direction, and also can change the view angle continuously.

BRIEF DESCRIPTION OF THE DRAWINGS

These objects and other objects and advantages of the present invention will become more apparent upon reading of the following detailed description and the accompanying drawings in which:

FIGS. 5A and 5B show the structure of a facing distance changing device of the view angle limiting device, where FIG. 5A is an operation explanation diagram of a state that first and second transparent plates are separated, and FIG. 5B is an operation explanation diagram of a state that the first an second transparent plates are brought into airtight contact;

FIGS. 9A and 9B show the distribution of intensity of rays of light emitted in case of narrow view angle display of the liquid crystal display apparatus, where FIG. 9A is a diagram showing light intensity distribution in a direction parallel with the left and right direction of the screen of a liquid crystal display device, and FIG. 9B is a diagram showing light intensity distribution in a direction parallel with the up and down direction of the screen;

FIGS. 10A and 10B show the distribution of intensity of rays of light emitted in case of wide view angle display of the liquid crystal display apparatus, where FIG. 10A is a diagram showing light intensity distribution in a direction parallel with the left and right direction of the screen of the liquid crystal display device, and FIG. 9B is a diagram showing light intensity distribution in a direction parallel with the up and down direction of the screen.

DETAILED DESCRIPTION OF THE PREFERRED EMBODIMENTS

Figure 1:
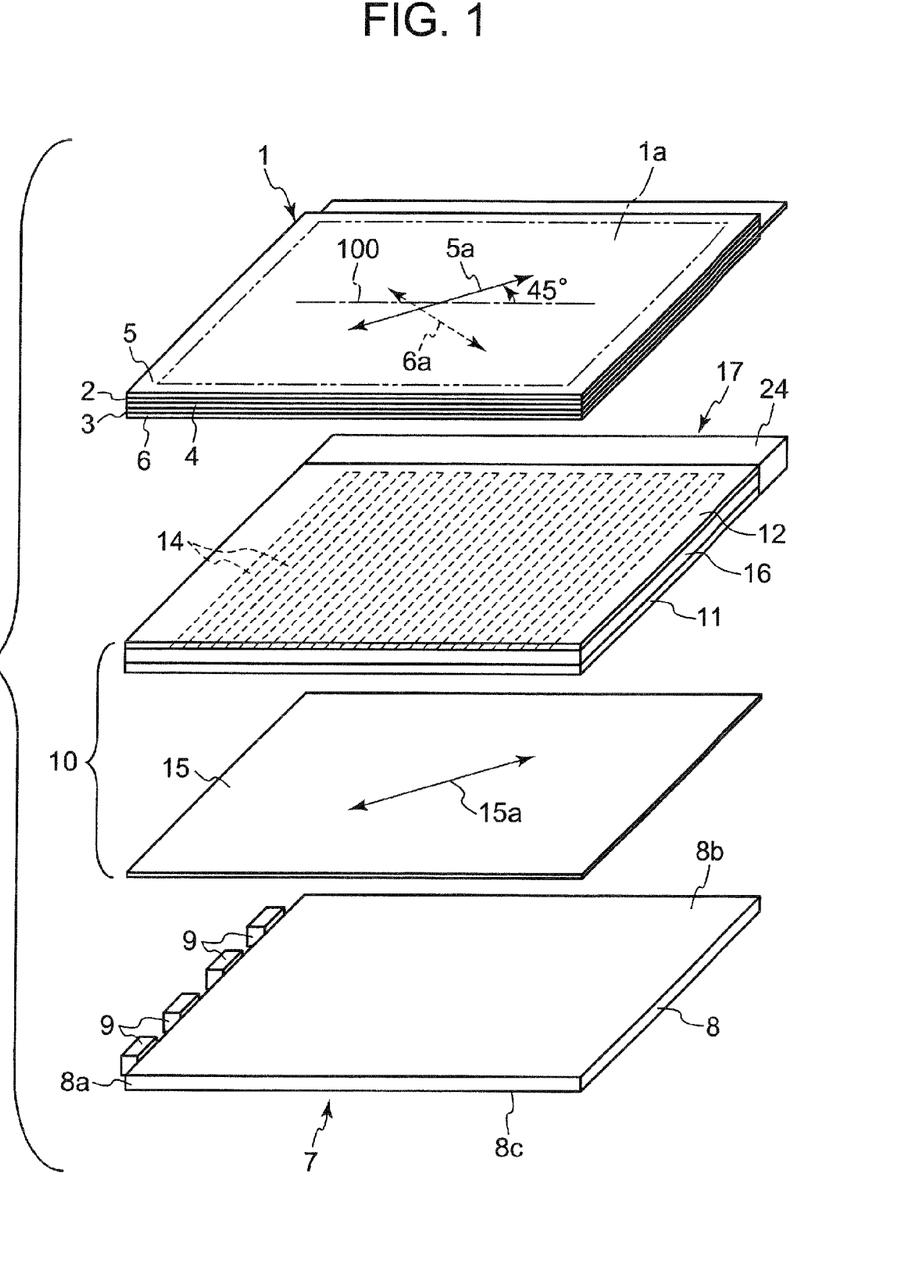
FIG. 1 is an exploded perspective view of a liquid crystal display apparatus showing a first embodiment of the present invention.
Figure 2:
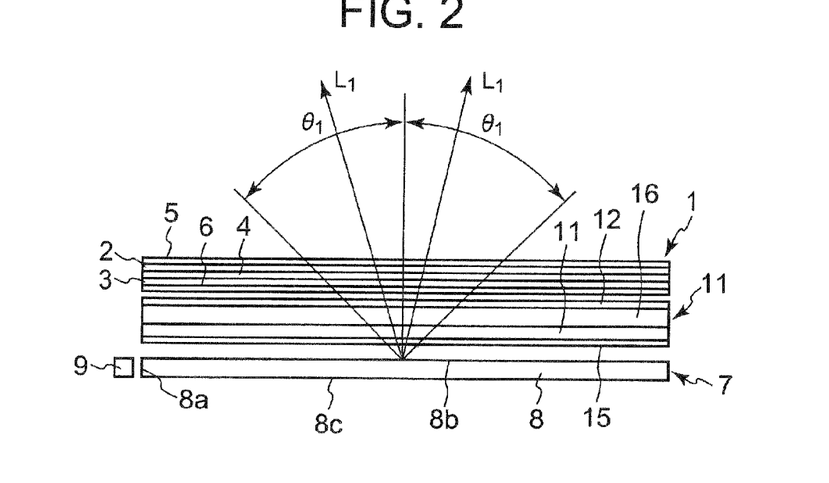
FIG. 2 is a side elevation of the liquid crystal display apparatus.

FIG. 1 to FIG. 10 show the first embodiment of the present invention. FIG. 1 is an exploded perspective view of a liquid crystal display apparatus, and FIG. 2 is a side elevation of the liquid crystal display apparatus.

The present liquid crystal display apparatus comprises a liquid crystal display device 1 having a screen region 1a on which a plurality of pixels (unillustrated) which control light transmission are arranged in a matrix, a surface light source 7 which is disposed at an opposite side to the observer side (the upper side in FIG. 1 and FIG. 2) of the liquid crystal display device 1 and irradiates illumination light toward the liquid crystal display device 1, and a view angle limiting device 10 disposed between the liquid crystal display device 1 and the surface light source 7.

The liquid crystal display device 1 is an active matrix liquid crystal display device. Though the illustration of the internal structure is omitted, the liquid crystal display device 1 comprises, on the inner surface of one of a pair of transparent substrates 2 and 3 joined via a frame-like sealing member 4, for example, on the inner surface of the substrate 3 that is on the opposite side to the observer side, a plurality of transparent pixel electrodes arranged in a matrix of a row direction (a left and right direction of the screen) and a column direction (an up and down direction of the screen), a plurality of TFTs (Thin Film Transistors) connected to the pixel electrodes respectively, a plurality of gate lines connected to the rows of TFTs respectively, and a plurality of data lines connected to the columns of TFTs respectively. On the inner surface of the other substrate, i.e., the substrate 2 on the observer side, there are provided a transparent opposing electrode formed of a monolithic film that faces the plurality of pixel electrodes, and color filters of three colors of red, green, and blue which are formed so as to respectively correspond to a plurality of pixels each defined by a region in which each of the plurality of pixel electrodes and the opposing electrode face each other. A liquid crystal layer is sealed in a region enclosed by the sealing member 4 between the pair of substrates 2 and 3.

Further, the liquid crystal display device 1 is a TN (Twisted Nematic) liquid crystal display device in which the liquid crystal molecules of the liquid crystal layer are twisted at a tilt angle of substantially 90° between the pair of substrates 2 and 3, and comprises a pair of polarizing plates 5 and 6 disposed on the observer side and the side opposite to that side.

The liquid crystal display device 1 according to the present embodiment is of a normally white mode. Of the pair of polarizing plates 5 and 6, the polarizing plate 5 on the observer side is disposed so as to have its transmission axis 5a run in a direction inclined at substantially 45° from a horizontal axis 100 of the screen to one side, for example, to the anticlockwise side as seen from the observer side. The polarizing plate 6 on the opposite side is disposed so as to have its transmission axis 6a substantially orthogonally cross the transmission axis 5a of the polarizing plate 5 on the observer side.

The surface light source 7 comprises a light guide plate 8 formed of a plate-like transparent member, and a plurality of light emitting elements 9 such as LEDs (Light Emitting Diodes) or the like. The light guide plate 8 has its one end surface serve as a light incident end surface 8a from which light enters, one of its two plate surfaces serve as a light emitting surface 8b from which the light entering from the light incident end surface 8a is emitted, and the other plate surface serve as a reflecting surface 8c which reflects the light entering from the light incident end surface 8a toward the light emitting surface 8b. The light emitting elements 9 are disposed so as to face the light incident end surface 8a of the light guide plate 8.

The surface light source 7 has the light from the light emitting elements 9 enter the light guide plate 8 from its light incident end surface 8a, and has the light be emitted from the entire area of the light emitting surface 8b of the light guide plate 8 to be diffused in an angular range of light diffusion, that is generally uniform in all surrounding directions of the normal line of the light guide plate 8.

The view angle limiting device 10 is an optical element that allows a ray of illumination light from the surface light source 7 to pass through the liquid crystal display device 1 if the ray of illumination light has a directivity within a predetermined angular range with respect to the normal line of the liquid crystal display device 1, but limits the passing of a ray of illumination light if the ray has a directivity inclined at an angle that is not within the predetermined angular range. The view angle limiting device 10 comprises a first retardation plate that gives a phase difference amounting to ½ of the wavelength to a ray of transmission light that passes therethrough, and a second retardation plate that gives a phase difference amounting to ½ of the wavelength to a ray of transmission light that passes therethrough. A plurality of first retardation layers each having a predetermined plan-view shape are arranged on an area of the first retardation plate that corresponds to the screen region 1a of the liquid crystal display device 1, such that the layers are arranged on the plane of the area so as to be spaced apart from each other. A plurality of second retardation layers are arranged on an area of the second retardation plate that corresponds to the screen region 1a, such that the layers are disposed at positions other than positions corresponding to where the plurality of first retardation layers are arranged. The first retardation plate and the second retardation plate are disposed so as to have a predetermined gap therebetween.

Figure 3:
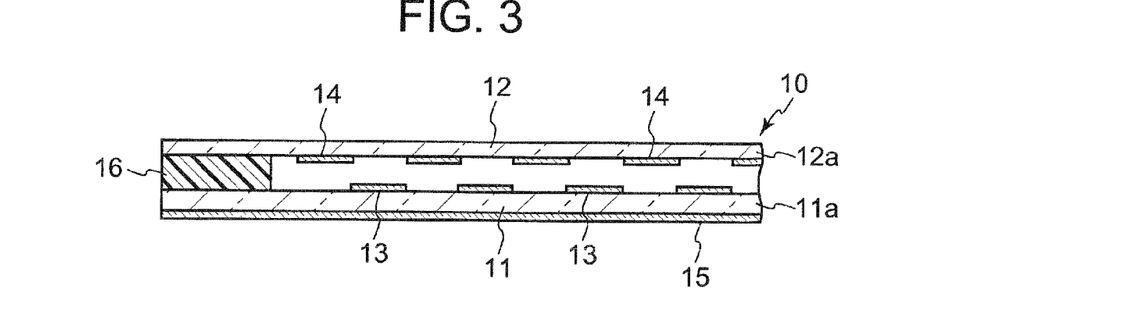
FIG. 3 is a cross sectional view of a part of a view angle limiting device.
Figure 4:
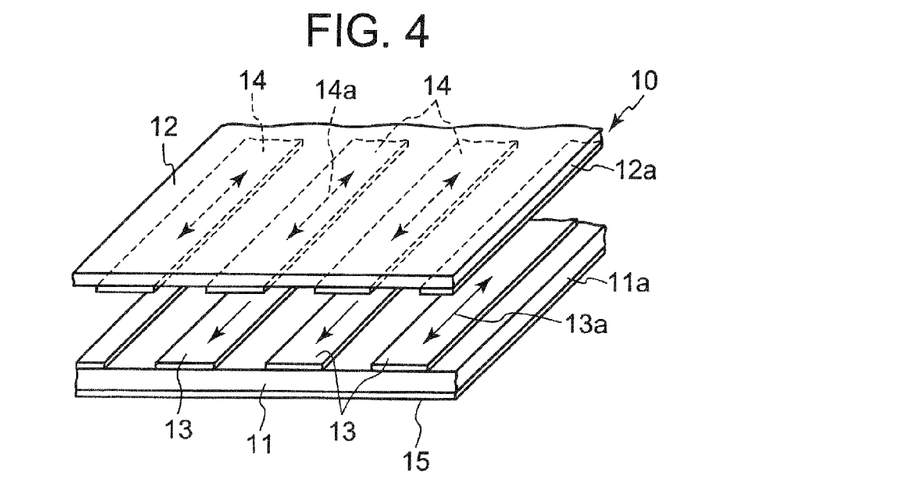
FIG. 4 is a perspective view of a part of the view angle limiting device.

FIG. 3 and FIG. 4 are a cross sectional view and a perspective view of a part of the view angle limiting device 10. The view angle limiting device 10 comprises a first transparent plate 11 on which a plurality of first ½ retardation layers 13 are formed, a second transparent plate 12 facing the first transparent plate 11 with a predetermined gap therebetween on which a plurality of second ½ retardation layers 14 are formed, and a polarizing film 15 formed on the outer surface of one of the first and second transparent plates 11 and 12. The plurality of ½ retardation layers 13, which have a predetermined planar shape and give a phase difference of ½ of the wavelength between rays of ordinary light and rays of extraordinary light among rays of transmission light, are arranged on the inner surface of the first transparent plate 11 that faces the second transparent plate 12, such that the ½ retardation layers 13 are spaced apart from each other on the plane of the plate 11. The plurality of ½ retardation layers 14 are arranged on the inner surface of the second transparent plate 12, such that the layers 14 are spaced apart from each other and do not face the plurality of ½ retardation layers 13. That is, as shown in FIG. 3, the plurality of ½ retardation layers 13 and 14 of the view angle limiting device 10 are formed alternately on the first transparent plate 11 and second transparent plate 12, such that they serve as substantially a single retardation plate as seen from the direction of the normal line of the liquid crystal display device 1.

The first transparent plate 11 and second transparent plate 12 of the view angle limiting device 10 are each formed of a glass plate or the like that gives substantially no birefringence to a ray of transmission light.

According to the present embodiment, the ½ retardation layers 13 and 14 are formed of a uniaxially-stretched film, a polymer liquid crystal layer, or the like. The ½ retardation layers 13 and 14 are each formed into a stripe shape that is laid along a predetermined direction.

For example, the ½ retardation layers 13 or 14 can be formed by arranging a plurality of ½ retardation films having a stripe shape obtained by cutting a uniaxially-stretched film into belt-shaped portions on the surface of the transparent plate 11 or 12 side by side and adhering the films to the surface of the transparent plate 11 or 12, or by coating or printing polymer liquid crystal on the surface of the transparent plate 11 or 12 and polymerizing the polymer liquid crystal such that the liquid crystal molecules are aligned to form stripes with their longer axis oriented in one predetermined direction.

The ½ retardation layers 13 or 14 are formed in parallel with each other such that they are apart from each other by a same interval as the width the layers themselves. The ½ retardation layers 13 and 14 are formed to have a positional relationship in which a first ½ retardation layer 13 and a second ½ retardation layer 14, which adjoin each other when seen from the direction of the normal line of the transparent plates 11 and 12, have their side edges overlaid.

Further, the ½ retardation layers 13 and 14 are formed to have as small a width and an interval as possible, so as to make their width correspond to the accumulated width and interval of some pixels, or preferably correspond to the width of one pixel, in order that parallel stripe patterns, which are made by the overlaying side edges of the first ½ retardation layers 13 and second ½ retardation layers 14 when seen from a direction inclined from the normal line of the transparent plates 11 and 12 and inclined in the direction of the width of the stripe shape of the layers, may be less distinguishable.

The gap between the first and second transparent plates 11 and 12 is predetermined depending on the view angle to limit the visibility. The first and second transparent plates 11 and 12 are joined to each other by a frame-like spacer 16 having a thickness corresponding to this gap. The spacer has such a thickness as corresponding to the length of the distance between the first ½ retardation layers 13 and the second ½ retardation layers 14, at which distance a ray of light which enters a range of a view limiting angle which is not within the range of the predetermined view angle, passes through both the first and second ½ retardation layers 13 and 14, and the non-retarding regions that exist between the first ½ retardation layers 13 on the first transparent plate 11 and the non-retarding regions that exist between the second ½ retardation layers 14 on the second transparent plate 12.

That is, the gap between the first and second transparent plates 11 and 12 is set such that the distance between the first ½ retardation layers 13 and the second ½ retardation layers 14 is equal to the width thereof or the interval between the layers 13 or between the layers 14 likewise the present embodiment, in a case where the visibility from a direction inclined from the normal line of the liquid crystal display device 1 by an angle lager than 45° is to be limited. Further, in a case where the view angle to allow screen observation is set in an angular range smaller than 45°, the distance between the first ½ retardation layers 13 and the second ½ retardation layers 14 is set to be larger than the width thereof or the interval between the layers 13 or between the layers 14. To the contrary. in a case where the view angle to allow observation is set in an angular range larger than 45°, the distance between the first ½ retardation layers 13 and the second ½ retardation layers 14 is set to be smaller than the width there of or the interval between the layers 13 or between the layers 14.

The transparent plates 11 and 12 may be separable and contactable, between a state in which they face each other with the gap therebetween, and a state in which they closely contact each other.

In this case, the first transparent plate 11 is formed to have a sufficient strength while the second transparent plate 12 is formed to have elasticity so as to be flexible and deformable in the thickness-wise direction, and they are joined airtightly at their circumferential part via the frame-like spacer 16 which defines the distance between the transparent plates 11 and 12.

The view angle limiting device 10 comprises a facing distance changing device 17 which brings the first and second transparent plates 11 and 12 into airtight contact with each other by aspirating the air in the closed space surrounded by the spacer 16 between the first and second transparent plates 11 and 12 to the outside of the closed space.

Figure 5A:
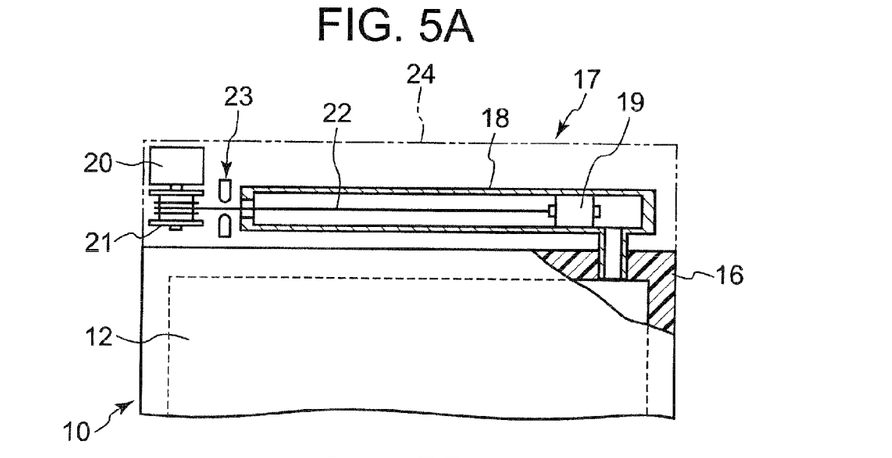
Figure 5B:
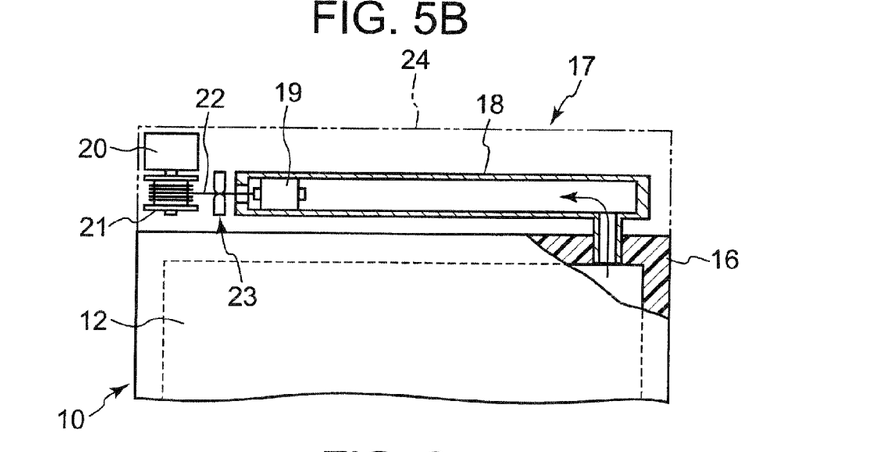

FIG. 5A and FIG. 5B are structure diagrams of the facing distance changing device 17, where FIG. 5A shows a state that the first and second transparent plates 11 and 12 are separated, and FIG. 5B shows a state that the first and the second transparent plates 11 and 12 are brought into airtight contact.

The facing distance changing device 17 is arranged at an external side of the first and second transparent plates 11 and 12 so as to be along one edge of the plates 11 and 12. The facing distance changing device 17 comprises a cylinder 18 which has its one end connected to an aspiration hole formed at a part of the frame-like spacer 16, a piston 19 provided in the cylinder 18 so as to be movable in the direction of the length of the cylinder 18, a motor 20, a reel 21 arranged at a side of the other end of the cylinder 18 and driven to rotate by the motor 20, a wire 22 wound around the reel 21 and introduced into the cylinder 18 from a hole provided in a surface of the cylinder 18 at the other end thereof to have its end linked to the piston 19, a braking mechanism 23 arranged between the other end of the cylinder 18 and the reel 21 for locking the wire 22, and a protection cover 24.

In bringing the first and second transparent plates 11 and 12 into airtight contact, the facing distance changing device 17 rotates the reel 21 by the motor 20 in the wire winding direction and moves the piston 19 by the wire 22 from the one end to the other end of the cylinder 18, in order to aspirate the air in the space between the transparent plates 11 and 12 into the cylinder 18. With this aspiration, the facing distance changing device 17 puts the inside of the space at a negative pressure with respect to the outside pressure, and makes the second transparent plate 12 flexibly deformed by the pressure difference to airtightly contact the first transparent plate 11. When a predetermined amount of air necessary to bring the first and second transparent plates 11 and 12 into airtight contact is aspirated, the facing distance changing device 17 stops the motor 20, and locks the wire 22 by the braking mechanism 23 as shown in FIG. 5B to maintain the airtight contact state of the transparent plates 11 and 12.

In separating the first and second transparent plates 11 and 12, the facing distance changing device 17 release the lock of the wire 22 by the braking mechanism 23. When the wire 22 is released from being locked, the second transparent plate 12 returns by its elasticity to a state that it faces the first transparent plate 11 with the gap therebetween, and along with this, the air in the cylinder 18 is drawn into between the transparent plates 11 and 12 to make the piston 19 rotate the reel 21 in the wire forwarding direction and return to the side of the one end of the cylinder 18, as shown in FIG. 5A.

The rotation shaft of the motor 20 is in a substantially unloaded state while the motor 20 is stopped (while there is no drive force), and the returning power of the second transparent plate 12 by its elasticity can therefore rotate the reel 21 in the wire forwarding direction and separate the first and second transparent plates 11 and 12 from each other.

Figure 6:
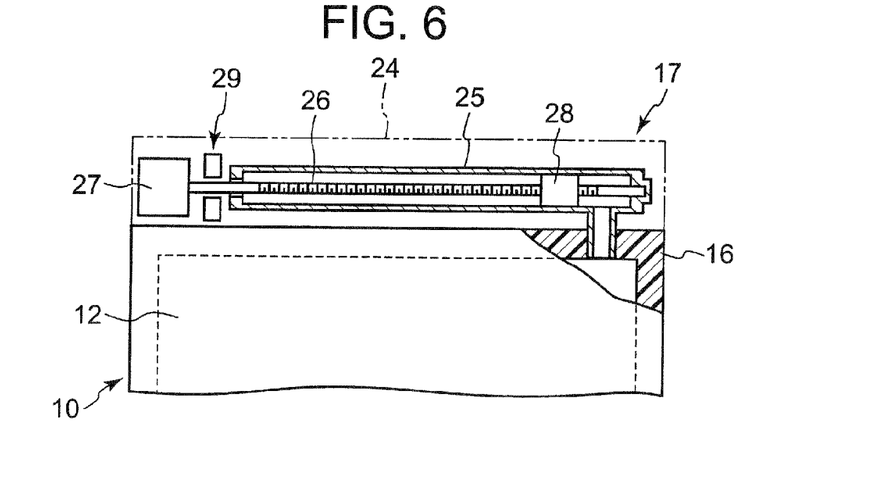
FIG. 6 is a structure diagram of another facing distance changing device.

FIG. 6 is a structure diagram of another facing distance changing device 17. The facing distance changing device 17 is arranged at an external side of the first and second transparent plates 11 and 12 so as to be along one edge of the plates 11 and 12. The facing distance changing device 17 comprises a cylinder 25 which has its one end connected to an aspiration hole provided at a part of the frame-like spacer 16, a rotation shaft 26 having screws on its outer circumferential surface and provided in the cylinder 25 in parallel with the cylinder's axis so as to have its one end protrude from a hole formed in a surface at the other end the cylinder 25 and have the protruding end linked with a reversibly rotatable motor 27 provided at the side of the other end of the cylinder 25, a piston 28 provided in the cylinder 25 while being screwed on the rotation shaft 26 and moved in the direction of the length of the cylinder 25 by the rotation of the rotation shaft 26 with its own rotation in the circumferential direction prohibited by the cylinder 25, a braking mechanism 29 for locking the rotation shaft 26, and a protection cover 24.

In bringing the first and second transparent plates 11 and 12 into airtight contact, the facing distance changing device 17 rotates the rotation shaft 26 in one direction by the motor 27 to move the piston 28 from the one end to the other end of the cylinder 25 and aspirate the air in the space between the transparent plates 11 and 12 into the cylinder 25. With this aspiration, the facing distance changing device 17 puts the inside of the space at a negative pressure with respect to the outside pressure, and makes the second transparent plate 12 flexibly deformed by the pressure difference to airtightly contact the first transparent plate 11. When a predetermined amount of air necessary for bringing the first and second transparent plates 11 and 12 into airtight contact is aspirated, the facing distance changing device 17 stops the motor 27 and locks the rotation shaft 26 by the braking mechanism 29 to maintain the airtight contact state of the transparent plates 11 and 12.

In separating the first and second transparent plates 11 and 12, the facing distance changing device 17 releases the rotation shaft 26 from being locked by the braking mechanism 29, and reversibly rotates the rotation shaft 26 by the motor 27 to move the piston 28 in the reverse direction and forcibly return the air in the cylinder 25 into between the first and second transparent plates 11 and 12, such that the air pressure at that time brings the second transparent plate 12 to its original state where it faces the first transparent plate 11 having the gap therebetween. When the piston 28 is moved to the initial position at the one end of the cylinder 25, i.e., when the second transparent plate 12 is restored to its original state, the facing distance changing device 17 stops the motor 27 and locks the rotation shaft 26 by the braking mechanism 29 to maintain the separate state of the transparent plates 11 and 12.

The present liquid crystal display apparatus is mounted at the display section of an electronic apparatus such as a portable phone, etc., and the facing distance changing device 17 changes the distance between the first and second transparent plates 11 and 12 in response to selection of a wide view angle or a narrow view angle made by, for example, a view angle selection key or the like provided on the electronic apparatus. Specifically, the facing distance changing device 17 is structured to bring the first and second transparent plates 11 and 12 into airtight contact when a wide view angle is selected, and to separate the first and second transparent plates 11 and 12 when a narrow view angle is selected.

The polarizing film 15 of the view angle limiting device 10 is adhered to the outer surface of the first transparent plate 11 of the first and second transparent plates 11 and 12, as shown in FIG. 1. The polarizing film 15 is arranged so as to have its transmission axis 15a substantially orthogonally cross the transmission axis 6a of the polarizing plate 6 on the side opposite to the observer side, of the pair of polarizing plates 5 and 6 of the liquid crystal display device 1.

A slow axis 13a of the first ½ retardation layers (hereinafter referred to as first retardation layers) 13 formed on the first transparent plate 11 of the view angle limiting device 19 and a slow axis 14a of the second ½ retardation layers (hereinafter referred to as second retardation layers) 14 formed on the second transparent plate 12 are substantially in parallel with each other and cross the transmission axis 15a of the polarizing film 15 at an angle of substantially 45°.

According to the present embodiment, the slow axes 13a and 14a of the first retardation layers 13 and second retardation layers 14 correspond to the direction of the length of the retardation layers 13 and 15 formed into a strip shape, i.e., correspond to the direction which substantially orthogonally crosses the horizontal axis 100 of the screen of the liquid crystal display deice 1.

The view angle limiting device 10 is arranged between the liquid crystal display element 1 and the surface light source 7 so as to have the polarizing film 15 face the surface light source 7.

Since the present liquid crystal display apparatus has the view angle limiting device 10 between the liquid crystal display device 1 and the surface light source 7, it can perform narrow view angle display of high security that prohibits peepers from seeing the display from an oblique direction, by allowing transmission of rays of light among the rays of illumination light from the surface light source 7, that go in a direction within a range of an angle predetermined with respect to the normal line of the liquid crystal display element 1 within which the display can be observed, and shielding rays of light that go in a direction within a range of a view limiting angle other than the range of the angle predetermined with respect to the normal line, within which the observation is limited.

Figure 7:
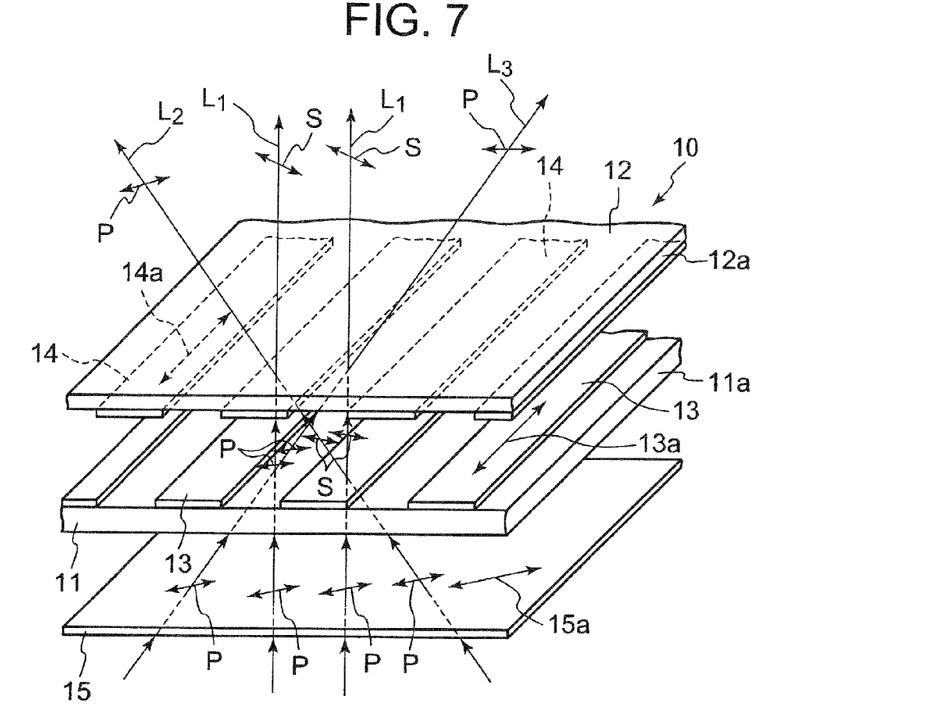
FIG. 7 is a behavior explanation diagram showing states of polarization of rays of transmission light when the first and second transparent plates of the view angle limiting device face each other with a gap therebetween.

FIG. 7 is a behavior explanation diagram showing states of polarization of rays of transmission light, in a case where the first and second transparent plates 11 and 12 of the view angle limiting device 10 face each other with a gap therebetween. Rays of illumination light (rays of non-polarized light) from the surface light source 7 enter the view angle limiting device 10 by being transformed, by the polarizing film 15 on the incident side (a side of a surface of the view angle limiting device 10 facing the surface light source 7) of the view angle limiting device 10, into rays of linearly-polarized light P parallel with the transmission axis 15a.

The ½ retardation layers 13 and 14 on the inner surfaces of the first and second transparent plates 11 and 12 of the view angle limiting device 10 are formed such that the ½ retardation layers 14 on the second transparent plate 12 face the regions between the ½ retardation layers 13 on the first transparent plate 11 and such that the distance between the ½ retardation layers 13 and ½ retardation layers 14 is substantially equal to the width of the layers 13 and 14 or the interval between the layers 13 or between the layers 14. Further, the slow axis 13a of the first retardation layers 13 formed on the first transparent plate 11 of the view angle limiting device 10 and the slow axis 14a of the second retardation layers 14 formed on the second transparent plate 12 are substantially parallel with each other and cross the transmission axis 15a of the polarizing film 15 at an angle of substantially 45°.

Thus, among the rays of linearly-polarized light P that enter the view angle limiting device 10, rays of light that pass through either the ½ retardation layers 13 on the first transparent plate 11 of the view angle limiting device 10 or the ½ retardation layers 14 on the second transparent plate 12, have their polarization plane rotated by 90° by the ½ retardation layers 13 or the ½ retardation layers 14 and are emitted from the view angle limiting device 10 by being transformed into rays of linearly-polarized light S whose polarization plane is orthogonal to the rays of linearly-polarized light P that have passed through the polarizing film 15. On the other hand, among the rays of linearly-polarized light P that enter the view angle limiting device 10, rays of light that pass both the ½ retardation layers 13 on the first transparent plate 11 of the view angle limiting device 10 and the ½ retardation layers 14 on the second transparent plate 12 have their polarization plane rotated by 180° by the ½ retardation layers 13 and 14 and are emitted from the view angle limiting device 10 by being transformed into rays of linearly-polarized light P whose polarization plane is parallel with the rays of linearly-polarized light P that have passed through the polarizing film 15. Rays of light that pass neither the ½ retardation layers 13 on the first transparent plate 11 of the view angle limiting device 10 nor the ½ retardation layers 14 on the second transparent plate 12 have their polarization plane remaining un-rotated, and are emitted form the view angle limiting device 10 as unchanged from the rays of linearly-polarized light P.

Accordingly, among the rays of light that go in directions within a range of the angle predetermined with respect to the normal line of the liquid crystal display device 1 within which the observation is allowed, rays of light (hereinafter referred to as rays of view angle light L1) that pass through the ½ retardation layers 13 on the first transparent plate 11 and non-retarding regions existing between the ½ retardation layers 14 on the second transparent plate 12, or pass through the non-retarding regions existing between the ½ retardation layers 13 on the first transparent plate 11 and ½ retardation layers 14 on the second transparent plate 14 enter the liquid crystal display device 1 by being transformed into the rays of linearly-polarized light S whose polarization plane is rotated by 90°. Since the polarization plane of the rays of linearly-polarized light S is substantially parallel with the transmission axis 6a of the polarizing plate 6 on the opposite side, these rays pass through the liquid crystal display device 1 to be observed by an observer.

Among the rays of light that go in directions within the range of the angle predetermined with respect to the normal line of the liquid crystal display device 1 within which the observation is allowed, rays of light L2 that have passed both the ½ retardation layers 13 on the first transparent plate 11 and the ½ retardation layers 14 on the second transparent plate 12, and rays of light L3 that have passed through the non-retarding regions existing between the ½ retardation layers 13 on the first transparent plate 11 and the non-retarding regions existing between the ½ retardation layers 14 on the second transparent plate 12, and have passed neither the ½ retardation layers 13 nor the ½ retardation layers 14 enter the liquid crystal display device 1 as rays of linearly-polarized light P. Since the polarization plane of these rays of linearly-polarized light P is substantially orthogonal to the transmission axis 6a of the polarizing plate 6 on the opposite side, these rays are absorbed into the polarizing plate 6 on the opposite side and not emitted to the observer side.

The rays of light (hereinafter referred to as rays of view limiting angle lights L2 and L3) that go in directions within a rang of a view limiting angle within which the visibility is limited, which directions are inclined from the normal line of the liquid crystal display device 1 at angles larger than the angles within the predetermined range of the angle to the direction perpendicular to the direction of lengthwise direction of the ½ retardation layers 13 and 14, pass through both the ½ retardation layers 13 and 14 on the first and second transparent plates 11 and 12, or pass through both the non-retarding regions between the first retardation layers 13 and 13 and the non-retarding regions between the second retardation layers 14 and 14 on the first and second transparent plates 11 and 12. Accordingly, these rays of view limiting angle lights L2 and L3 have their polarization plane rotated by 90° by the ½ retardation layers 13 on the first transparent plate 11 and further rotated by 90° by the ½ retardation layers 14 on the second transparent plate 12, or pass through the regions between the ½ retardation layers 13 and 13 and the regions between the ½ retardation layers 14 and 14 on both the first and second transparent plates 11 and 12 as rays of linearly-polarized light P without changing their polarization state.

Since the polarization plane of these rays of linearly-polarized light P is substantially orthogonal to the transmission axis 6a of polarizing plate 6 on the opposite side, these rays are absorbed into the polarizing plate 6 on the opposite side and not emitted to the observer side.

Accordingly, in a case where the first and second transparent plates 11 and 12 of the view angle limiting device 10 are arranged to have a gap therebetween, the only the rays of view angle light L1 pass through the liquid crystal display device 1 to be emitted to the observer side within a predetermined range of a small diffusion angle θ1 (45° according to the present embodiment), as shown by the arrows in FIG. 2. Thus, the display on the liquid crystal display device 1 can be viewed from a direction within the range of that angle predetermined with respect to the normal line of the liquid crystal display device 1, i.e., from the front forward direction. In this case, since, among the rays of light that go in the directions within the range of an angle predetermined with respect to the normal line of the liquid crystal display device 1 within which the display can be observed, the rays of light that have passed through both the ½ retardation layers 13 on the first transparent plate 11 and the ½ retardation layers 14 on the second transparent plate 12, and that have passed through the non-retarding regions existing between the ½ retardation layers 13 on the first transparent plate 11 and the non-retarding regions existing between the ½ retardation layers 14 on the second transparent plate 12 are absorbed into the polarizing plate 16 on the opposite side, the rays of view angle light L1 have the strongest light intensity in the front forward direction and have the light intensity reduced as more inclined from the normal line. The screen on the whole seems black when seen from a direction within the range of a view limiting angle which is greatly inclined from the front forward direction of the liquid crystal display device 1.

As described above, since the present liquid crystal display apparatus has the transmission axis 15a of the polarizing film 15 of the view angel limiting device 10 arranged substantially orthogonally to the transmission axis 6a of the polarizing plate 6 on the opposite side to the observer side of the liquid crystal display device 1, has the slow axis 13a of the plurality of ½ retardation layers 13 on the first transparent plate 11 of the view angle limiting device 10 and the slow axis 14a of the plurality of ½ retardation layers 14 on the second transparent plate 12 arranged substantially in parallel with each other, and has the slow axes 13a and 14a of these ½ retardation layers 13 and 14 cross the transmission axis 15a of the polarizing film 15 at an angle of substantially 45°, the apparatus can perform narrow view angle display by which the screen on the whole becomes black when seen fro an oblique direction.

Further, the present liquid crystal display apparatus has the ½ retardation layers 13 and 14 on the inner surfaces of the first and second transparent plates 11 and 12 formed into a stripe shape laid along a predetermined direction, the apparatus can narrow the view angle in the direction perpendicular to the lengthwise direction of the stripe-shaped ½ retardation layers 13 and 14.

Furthermore, the present liquid crystal display apparatus performs narrow view angle display by means of the view angle limiting device 10, in which the plurality of ½ retardation layers 13 and 14 are formed on the facing inner surfaces of the first and second transparent plates 11 and 12 facing each other with a gap therebetween such that ½ retardation layers 14 on the second transparent plate 12 face the regions between the ½ retardation layers 13 on the first transparent plate 11, and the polarizing film 15 is provided at the outer surface of one of the first and second transparent plates 11 and 12. Thus, the view angle limiting device 10 has a simple structure and can be manufactured easily, contributing to reducing the cost of the liquid crystal display apparatus.

Further, the present liquid crystal display apparatus has the ½ retardation layers 13 and 14 on the inner surfaces of the first and second transparent plates 11 and 12 formed into a simple shape of stripes. This makes it possible to manufacture the view angle limiting device 10 further easily and to further reduce the cost of the liquid crystal display apparatus.

Furthermore, the present liquid crystal display apparatus can perform both narrow view angle display and wide view angle display which allows the display to be viewed from an oblique direction, by structuring the first and second transparent plates 11 and 12 of the view angle limiting device 10 to be separable and contactable such that they face each other having a gap therebetween and such that they airtightly contact each other.

Figure 8:
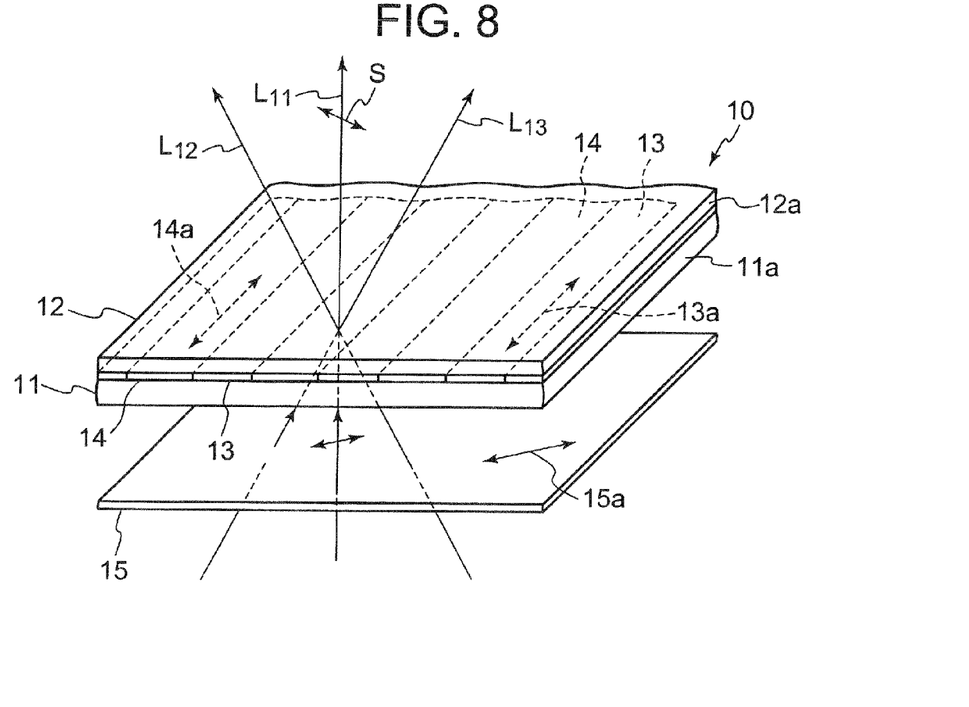
FIG. 8 is a behavior explanation diagram showing states of polarization of rays of transmission light when the first and second transparent plates of the view angle limiting device are brought into airtight contact.

FIG. 8 is a behavior explanation diagram showing states of polarization of rays of transmission light, in a case where the first and second transparent plates 11 and 12 of the view angle limiting device 10 airtightly contact each other. In this case, since the ½ retardation layers 13 and 14 on the inner surfaces of the first and second transparent plates 11 and 12 become continual on the same plane, rays of view angle light L11 and also rays of view limiting angle lights L12 and L13 pass through only any one of the ½ retardation layers 13 and 14 on the first and second transparent plates 11 and 12 of the view angle limiting device 10.

Therefore, in this case, both the rays of view angle light L11 and the rays of view limiting angle lights L12 and L13 are emitted toward the liquid crystal display device 1 as transformed into rays of linearly-polarized light S whose polarization plane is rotated by 90° from rays of linearly-polarized light P, which have entered the view angle limiting device 10 by passing through the polarizing film 15 on the incident side, and these rays of lights L11, L12, and L13 enter the liquid crystal display device 1 by passing through the polarizing plate 6 on the opposite side.

Accordingly, in the case where the first and second transparent plates 11 and 12 are brought into airtight contact, both the rays of view angle light L11 and the rays of view limiting angle lights L12 and L13 pass through the liquid crystal display device 1 and are emitted to the observer side in an angular range of light diffusion that corresponds to the view angle characteristic inherent in the liquid crystal display device 1. Thus, the display on the liquid crystal display device 1 can be viewed from the front forward direction and from a direction inclined from the normal line of the liquid crystal display device 1.

Figure 9A:
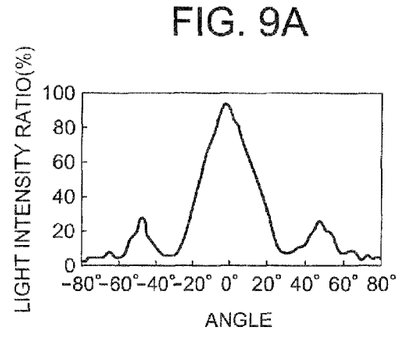
Figure 9B:
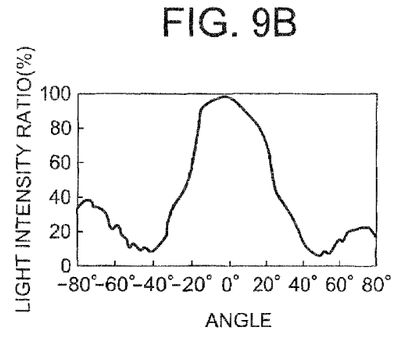
Figure 10A:
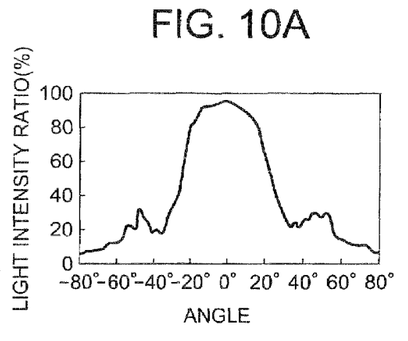
Figure 10B:
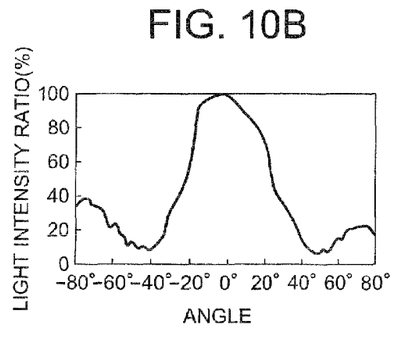

FIGS. 9A and 9B are diagrams showing the distribution of light intensity of rays of light emitted in case of the narrow view angle display of the liquid crystal display apparatus, and FIGS. 10A and 10B are diagrams showing the distribution of light intensity of rays of light emitted in case of the wide view angle display of the liquid crystal display apparatus. FIG. 9A and FIG. 10A show the distribution of light intensity in a direction parallel with the left and right direction of the screen of the liquid crystal display device 1, and FIG. 9B and FIG. 10B show the distribution of light intensity in a direction parallel with the up and down direction of the screen. In these diagrams, the light intensity ratios indicate relative values when the intensity of light emitted in the front forward direction in case of the wide view angle display shown in FIG. 10B is referred to as a reference value of 100.

In FIG. 9A and FIG. 10A, the positive angles indicate the angles inclined to the right side of the screen from the normal direction (the direction of 0°) of the liquid crystal display device 1, and the negative angles indicate the angles inclined to the left side of the screen from the normal direction. In FIG. 9B and FIG. 10B, the positive angles indicate the angles inclined to the up side of the screen from the normal direction, and the negative angles indicate the angles inclined to the down side of the screen from the normal direction.

Among the rays of light emitted in case of the narrow view angle display of the liquid crystal display apparatus, the rays of light that have an intensity ratio of 50% or larger in the left and right direction of the screen are diffused in an angular range of ±12° to 17° from the normal direction of the liquid crystal display device 1 as shown in FIG. 9A, and the rays of light that have an intensity ratio of 50% or larger in the up and down direction of the screen are diffused in an angular range of ±20° to 22° from the normal direction as shown in FIG. 9B. Accordingly, the view angle in the left and right direction (the direction perpendicular to the lengthwise direction of the stripe-shaped ½ retardation layers 13 and 14 of the view angle limiting device 10) of the screen can be narrowed sufficiently.

Further, among the rays of light emitted in case of the wide view angle display of the liquid crystal display apparatus, the rays of light that have an intensity ratio of 50% or larger in the left and right direction of the screen are diffused in an angular range of ±23° to 25° from the normal direction of the liquid crystal display device 1 as shown in FIG. 10A, and the rays of light that have an intensity ratio of 50% or larger in the up and down direction of the screen are diffused in an angular range of ±20° to 22° from the normal direction as shown in FIG. 10B. Accordingly, the view angles in the left and right direction and the up and down direction of the screen can be widened sufficiently.

The view angle limiting device 10 according to the first embodiment described above comprises the facing distance changing device 17 which airtightly joins the first and second transparent plates 11 and 12 via the frame-like spacer 16 and brings the first and second transparent plates 11 and 12 into airtight contact with each other by aspirating the air in the closed space surrounded by the spacer 16 between the first and second transparent plates 11 and 12 to the outside of the space. However, the view angle limiting device 10 may be structured otherwise.

Figure 11:
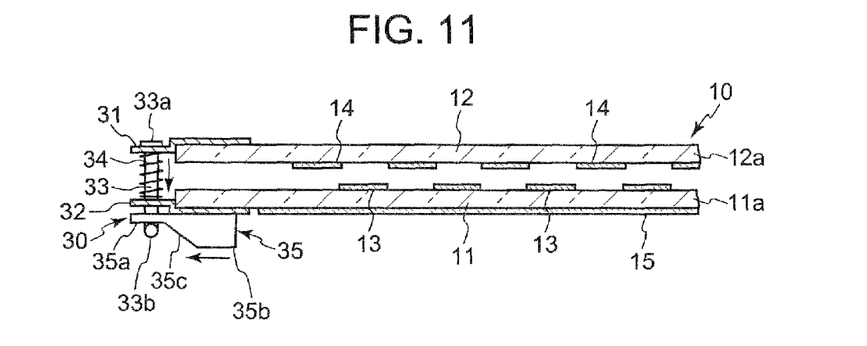
FIG. 11 is a cross sectional view of a part of a view angle limiting device showing a second embodiment of the present invention.

FIG. 11 is a cross sectional view of a part of the view angle limiting device 10 according to a second embodiment of the present invention. In the present view angle limiting device 10, the first and second transparent plates 11 and 12 are both formed of a glass plate or the like having a sufficient strength, and formed to be separable and contactable by a facing distance changing device 30 having a different structure from that of the facing distance changing device 17 according to the first embodiment. The plurality of ½ retardation layers 13 and 14 formed on the facing inner surfaces of the first and second transparent plates 11 and 12 and the polarizing film 15 provided at the outer surface of one of the first and second transparent plates 11 and 12 are the same as those in the first embodiment.

The facing distance changing device 30 of the view angle limiting device 19 comprises a pair of reinforcing frames 31 and 32 fixed at an edge of the first and second transparent plates 11 and 12 respectively, a rod 33 which is inserted through holes (unillustrated) formed in the reinforcing frames 31 and 32 respectively so as to face each other, and which has its flange 33a formed on its one end strike against the outer surface of one reinforcing frame 31 and has its other end protrude from the outer surface of the other reinforcing frame 32, a wedge member striking portion 33b formed on the other end of the rod 33 so as to be at a right angle to the rod 33, a spring member (coil spring) 34 fitted around the rod 33 between the pair of reinforcing frames 31 and 32, and a wedge member 35 slidably provided on the outer surface of the other reinforcing frame 32.

The wedge member 35 has two horizontal surfaces 35a and 35b (surfaces parallel with the outer surface of the reinforcing frame 32) which are formed at different heights at one end side and the other end side on a surface of the member 35 opposite to the surface having a slidable contact with the outer surface of the reinforcing frame 32, and a inclined surface 35c which is formed between the two horizontal surfaces 35a and 35b to connect them. The difference in height between the two horizontal surfaces 35a and 35b is set to be the same as the gap between the first and second transparent plates 11 and 12 when the transparent plates 11 and 12 are separated from each other.

The wedge member 35 is formed so as to be slidable from a position at which the lower horizontal surface 35a thereof at one end side strikes against the wedge member striking portion 33b of the rod 33 to a position at which the higher horizontal surface 35b at the other end side strikes against the wedge member striking portion 33b of the rod 33.

The rod 33, the spring member 34, and the wedge member 35 are provided at plural positions on the reinforcing frames 31 and 32, for example, at four corners thereof. The wedge members 35 at the respective positions are arranged to have their one end side face in the same direction and to be on the same side with respect to the wedge member striking portion 33b of the rod 33 with the one end side of the respective wedge members 35 facing in the same direction. And the wedge members 35 are fixed on an unillustrated frame-like member provided on the outer surface of the other reinforcing frame 32 reciprocably in the sliding direction of the wedge members 35, such that the wedge members 35 slide integrally along with the movement of the frame-like member.

That is, the facing distance changing device 30 separates the first and second transparent plates 11 and 12 by the spring force of the spring members 34 to make the transparent plates 11 and 12 face each other with a gap therebetween by sliding the wedge members 35 to the position at which the lower horizontal surfaces 35a at the one end side of the wedge members 35 strike against the wedge member striking portion 33b of the rods 33, and brings the first and second transparent plates 11 and 12 into airtight contact with each other by sliding the wedge members 35 to the position at which the higher horizontal surfaces 35b at the other end side of the wedge members 35 strike against the wedge member striking portion 33b of the rods 33.

In the liquid crystal display apparatus according to the present embodiment, it is preferred that a slidable lug for selecting between a wide view angle and a narrow view angle be provided on an electronic apparatus such as a portable phone or the like on which the present liquid crystal display apparatus is mounted, so that the frame-like member on which the wedge members 35 at the respective positions of the facing distance changing device 30 are fixed may be moved in response to the sliding operations on the slidable lug. This makes is possible to separate or bring into airtight contact the first and second transparent plates 11 and 12 of the view angle limiting device 10 without using electricity.

In the view angle limiting device 10 according to the above-described embodiments, the ½ retardation layers 13 and 14 on the first and second transparent plates 11 and 12 are formed into a stripe shape. However, the ½ retardation layers 13 and 14 may be formed into another shape, such as, for example, a checker board design.

The liquid crystal display apparatus according to the above-described embodiments comprises the liquid crystal display device 1 of a normally white mode. However, the liquid crystal display device 1 may be of a normally black mode. Further, the liquid crystal display device 1 may not only be of a TN type, but may be any of an STN (Supre Twisted Nematic) type, a homeotropic alignment type in which the liquid crystal molecules are aligned substantially perpendicularly to the substrate surface, a homogeneous alignment type in which the liquid crystal molecules are not twisted but aligned substantially in parallel with the substrate surface, a bend-alignment type in which the liquid crystal molecules are bend-aligned. Furthermore, the liquid crystal display device 1 may be a ferroelectric or an antiferroelectric liquid crystal display device, or of a transversal electric field type in which first and second electrodes having, for example, a pectinate shape are arranged on the inner surface of either of a pair of substrates to form a plurality of pixels and a transversal electric field (an electric field directed in a direction running along the substrate surface) is produced between the electrodes to change the alignment state of the liquid crystal molecules.

Furthermore, the liquid crystal display device 1 may be a GH (Guest-Host) liquid crystal display device, which comprises a liquid crystal layer made of liquid crystal in which a dichromatic dye is added and has a polarizing plate for improving the contrast arranged on either the observer side or the opposite side. It is possible to achieve narrow view angle display which makes the entire screen black when seen from an oblique direction, by arranging the transmission axis 15a of the polarizing film 15 of the view angle limiting device 10 substantially orthogonally to the transmission axis of the polarizing plate of the GH liquid crystal display device in a case where the polarizing plate is arranged on the opposite side to the observer side in the GH liquid crystal display device, and by arranging the transmission axis 15a of the polarizing film 15 of the view angle limiting device 10 substantially in parallel with the transmission axis of the polarizing plate of the GH liquid crystal display device in a case where the polarizing plate is arranged on the observer side in the GH liquid crystal display device.

Further, in the liquid crystal display apparatus according to the above-described embodiments, the liquid crystal display device 1 is a color image display device that comprises color filters having three colors of red, green, and blue each corresponding to any of the plurality of pixels. However, the present invention can also be applied to a field sequential liquid crystal display apparatus which uses a liquid crystal display device having no color filters.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning or an equivalent of the claims of the invention and within the claims are to be regarded to be in the scope of the present invention.

What is claimed is:

1. A liquid crystal display apparatus comprising:
 a liquid crystal display device having a screen region on which a plurality of pixels for controlling light transmission are arranged in a matrix;
 a surface light source which irradiates illumination light toward the screen region of the liquid crystal display device;
 a first substrate and a second substrate arranged between the liquid crystal display device and the surface light source so as to face each other;
 first retardation layers which give a phase difference of ½ of a wavelength to a ray of transmission light, and which are arranged on a predetermined region of a facing surface of the first substrate facing toward the second substrate;
 second retardation layers which give a phase difference of ½ of a wavelength to a ray of transmission light, and which are arranged on a facing surface of the second substrate facing toward the first substrate so as to avoid a region which overlaps with the first retardation layers;
 a polarizing film arranged between the second substrate and the surface light source; and a facing distance changing device which changes a distance between the first substrate and second substrate.

2. The liquid crystal display apparatus according to claim 1, wherein the facing distance changing device controls the first substrate and second substrate to be separated when narrowing a view angle, and controls the first substrate and second substrate to be brought closer when widening the view angle.

3. The liquid crystal display apparatus according to claim 1, wherein:
the liquid crystal display device comprises a pair of polarizing plates; and
the pair of polarizing plates are arranged such that a transmission axis of one of the polarizing plates which is arranged at the light source side is orthogonal to a transmission axis of the polarizing film.

4. The liquid crystal display apparatus according to claim 1, wherein a slow axis of the first retardation layers is arranged parallel to a slow axis of the second retardation layers, and to cross a transmission axis of the polarizing film at an angle of 45°.

5. The liquid crystal display apparatus according to claim 1, wherein the first retardation layers and the second retardation layers are respectively formed such that planar shapes thereof are formed into a stripe pattern.

6. The liquid crystal display apparatus according to claim 5, wherein the first retardation layers and the second retardation layers are respectively formed into a stripe pattern in a longitudinal direction when the liquid crystal display device is arranged to be in an original state.

7. The liquid crystal display apparatus according to claim 5, wherein the first retardation layers are formed into a stripe shape whose width is substantially equal to an interval between adjacent ones of the first retardation layers.

8. The liquid crystal display apparatus according to claim 5, wherein the second retardation layers are formed into a stripe shape whose width is substantially equal to an interval between adjacent ones of the second retardation layers.

9. The liquid crystal display apparatus according to claim 5, wherein the stripe width of the first retardation layers and the stripe width of the second retardation layers are substantially equal.

10. The liquid crystal display apparatus according to claim 1, wherein the first substrate and the second substrate are joined to each other via a spacer.

11. The liquid crystal display apparatus according to claim 10, wherein the spacer has elasticity.

12. The liquid crystal display apparatus according to claim 1, wherein the first substrate and the second substrate are respectively provided to be separable from and contactable to the second and first retardation layers, respectively, such that the first substrate and the second substrate face each other with a gap therebetween or are closely contacted to each other.

13. The liquid crystal display apparatus according to claim 5, wherein the surface light source comprises:
a light guide plate arranged to be parallel to the polarizing film; and
light emitting elements which enter light from a first end surface of the light guide plate that is parallel to an extending direction of the stripe pattern of the planar shapes of the first retardation layers and the second retardation layers.

\* \* \* \* \*